United States Patent [19]

Sanders

[11] Patent Number: 5,238,297
[45] Date of Patent: Aug. 24, 1993

[54] DETACHABLE WHEEL MOUNTING ASSEMBLY FOR GOLF TROLLEYS AND OTHER SIMILAR VEHICLES

[75] Inventor: Mark A. Sanders, Windsor, Great Britain

[73] Assignee: Acushnet Limited, Cambridgeshire, Great Britain

[21] Appl. No.: 746,862

[22] Filed: Aug. 19, 1991

[30] Foreign Application Priority Data

Aug. 20, 1990 [GB] United Kingdom ............... 9018210

[51] Int. Cl.⁵ .............................................. B60B 37/00
[52] U.S. Cl. ..................................... 301/111; 301/131; 301/119; 403/379
[58] Field of Search ................... 301/1, 111, 112, 119, 301/120, 121, 122, 126, 131; 403/109, 379; 280/646, DIG. 6

[56] References Cited

U.S. PATENT DOCUMENTS

| | | | |
|---|---|---|---|
| 1,188,337 | 6/1916 | Siebert et al. ........................ | 301/121 |
| 1,431,242 | 10/1922 | Lindberg . | |
| 2,610,875 | 9/1952 | Wheelden ....................... | 403/109 X |
| 2,717,807 | 9/1955 | Kapp ................................ | 301/111 X |
| 3,811,455 | 5/1974 | Thur ................................ | 403/379 X |
| 4,504,164 | 3/1985 | Bien ................................. | 403/379 X |
| 4,917,442 | 4/1990 | Johnson .......................... | 301/111 X |
| 5,029,946 | 7/1991 | Liao ................................ | 301/126 X |
| 5,060,903 | 10/1991 | Schworer ....................... | 403/109 X |

FOREIGN PATENT DOCUMENTS

| | | |
|---|---|---|
| 84488 | 7/1983 | European Pat. Off. . |
| 8911063 | 9/1988 | Fed. Rep. of Germany . |
| 3811757A1 | 10/1989 | Fed. Rep. of Germany . |
| 931701 | 7/1963 | United Kingdom . |

*Primary Examiner*—Russell D. Stormer
*Attorney, Agent, or Firm*—Pennie & Edmonds

[57] ABSTRACT

A detachable wheel mounting assembly for golf trolleys and the like comprises a plastics bearing sleeve (5) carrying the wheel (6) rotatably mounted thereon and held by a captive washer (9). Extending rearwardly of the sleeve (5) and integral therewith is a resilient finger tab (17) carrying a detent notch which engages a fixed detent (19) when the sleeve with the wheel attached is axially mounted on the stub axle or shaft (2) to lock the wheel on the shaft. When it is desired to detach the wheel, the detent is disengaged by finger pressure on the finger tab (17) permitting the wheel (6) and hearing sleeve (8) to be removed as a unitary assembly.

9 Claims, 3 Drawing Sheets

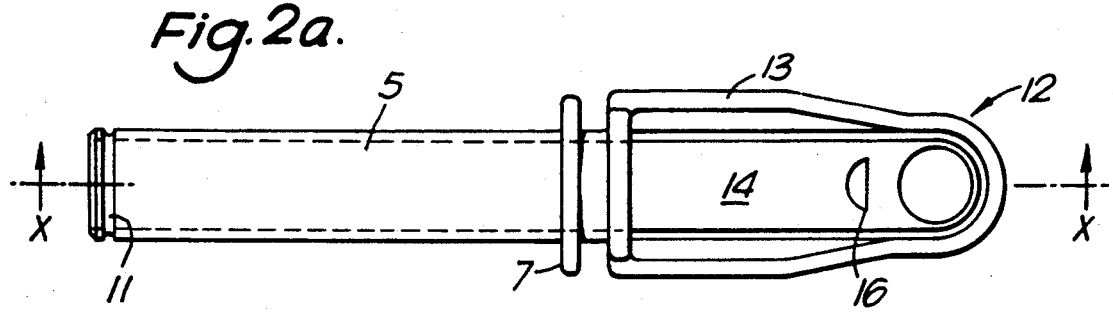
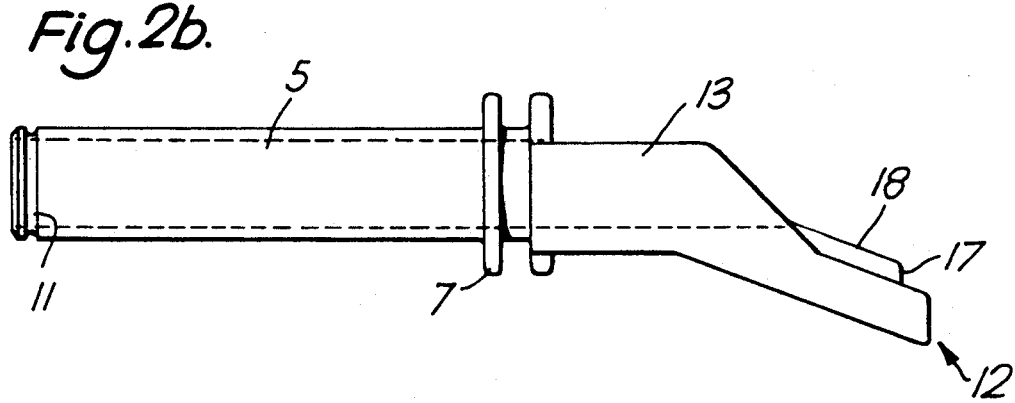
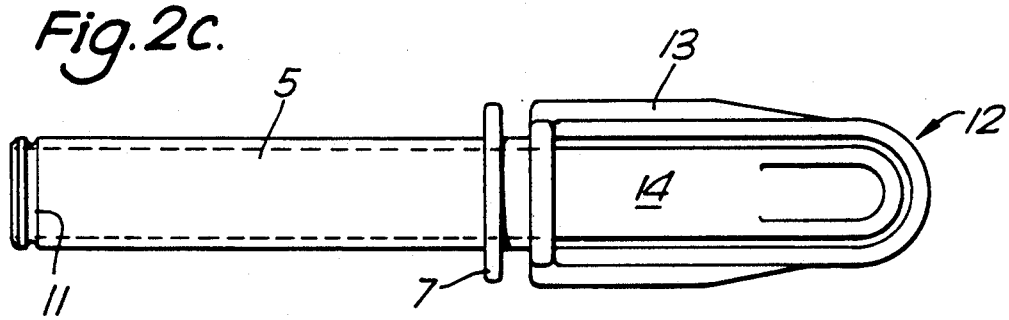
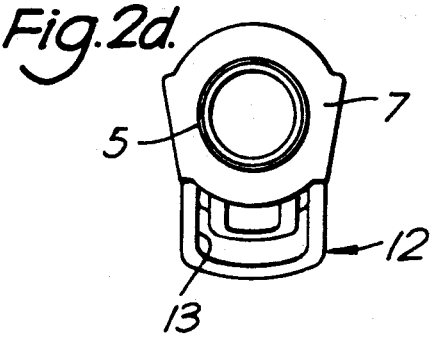 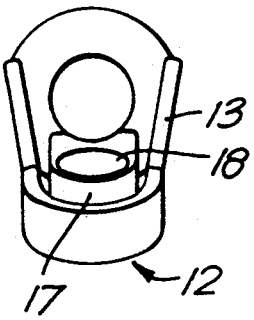

DETACHABLE WHEEL MOUNTING ASSEMBLY FOR GOLF TROLLEYS AND OTHER SIMILAR VEHICLES

FIELD OF THE INVENTION

This invention relates to a detachable wheel mounting assembly for golf trolleys, perambulators, push chairs and similar wheeled vehicles.

BACKGROUND AND PRIOR ART

Golf trolleys, perambulators, push chairs and like vehicles are frequently of a foldable or collapsible design permitting easy storage and/or transportation. In such cases it is frequently desirable also to be able to remove the wheels quickly and easily, and to be able to refit them just as easily when desired. Various detachable wheel mountings have been designed for this purpose but cheaper, simpler designs are always in demand.

In EP-A 0 084 488 there is disclosed a wheel mounting assembly for mounting a wheel on a stub axle or shaft and comprising a plastics sleeve or wheel bearing member which fits on or into the end of the stub axle or shaft and which is provided with a resilient tongue-like detent member which engages in a hole or recess in the axle to lock the wheel permanently onto the axle. In that case, however, the detent is not easily releasable, and indeed in some embodiments, is totally inaccessible, so that once the wheel has been mounted on the axle, it cannot then be released. The wheel mounting assembly of EP-A-0 084 488 is therefore totally unsuited to golf trolleys, push chairs, peramulators etc. where the wheels are required to be readily and easily detachable for ease of storage or transportation of the wheeled vehicle.

OBJECT OF THE INVENTION

The present invention seeks to satisfy that demand by providing an extremely simple, inexpensive yet effective detachable wheel mounting assembly for such items.

SUMMARY OF THE INVENTION

The detachable wheel mounting assembly according to this invention is designed for detachably mounting a wheel on a stub axle or shaft permanently affixed at one end to and supported by the frame of the vehicle, leaving the other end of the axle free to receive the wheel as a sliding fit thereon and provided with means for rotatably retaining the wheel on the axle.

According to the present invention, an outer axle member is provided in the form of a molded plastics sleeve slidably receivable on the stub axle and retainable thereon by a releasable, resilient detent member integral with said sleeve and engageable, when the sleeve is mounted on the axle, with a cooperating fixed detent member on the axle. The wheel itself is rotatably received thereon by the outer axle and is permanently retained thereon by permanent retaining means, thereby to form a unitary assembly with the outer axle member. "Permanent" in this context merely contrasts with the releaseable or detachable mounting of the outer axle member or sleeve on the stub axle, and is not to be taken as indicating that the wheel and outer axle member, which effectively acts as a bearing sleeve for the wheel, cannot be separated when it is desired, for example, to change the wheel or renew the bearing sleeve, for example, as may occasionally be necessary when either becomes damaged or worn.

When mounting the wheel and outer axle assembly on the stub axle, it is simply a case of sliding the wheel and outer axle assembly onto the stub axle until the detent engages to retain the outer axle, with the wheel rotatably retained thereon, in position on the inner stub axle. To remove the wheel, the detent is released so that the wheel and outer axle can be disengaged as a single, unitary assembly. Preferably, of course, the detent is finger operated, and in a preferred embodiment takes the form of a resilient lever member integral with the sleeve and extending coaxially therefrom and having on its radially inward surface, i.e. a surface directed inwardly towards the axis of the sleeve, a notch or ridge which, when the outer axle member slides on to the stub axle, resiliently engages a corresponding ridge or notch on the inner axle. Release of the detent is then achieved by simple finger pressure on the resilient detent lever to urge it away from the stub axle, disengaging the detent and enabling complete removal of the wheel assembly.

A variety of different plastics material may be used in the molding of the outer axle member, but preferred are polyethylene, nylon, polypropylene, polytetrafluoroethylene or polyacetal, and especially glass, carbon fibre or elastomer reinforced materials.

Likewise a variety of retaining means to retain the wheel on the outer axle as a unitary assembly therewith, but a simple split pin or retaining washer or ring will be usual.

DETAILED DESCRIPTION

Figure 1:
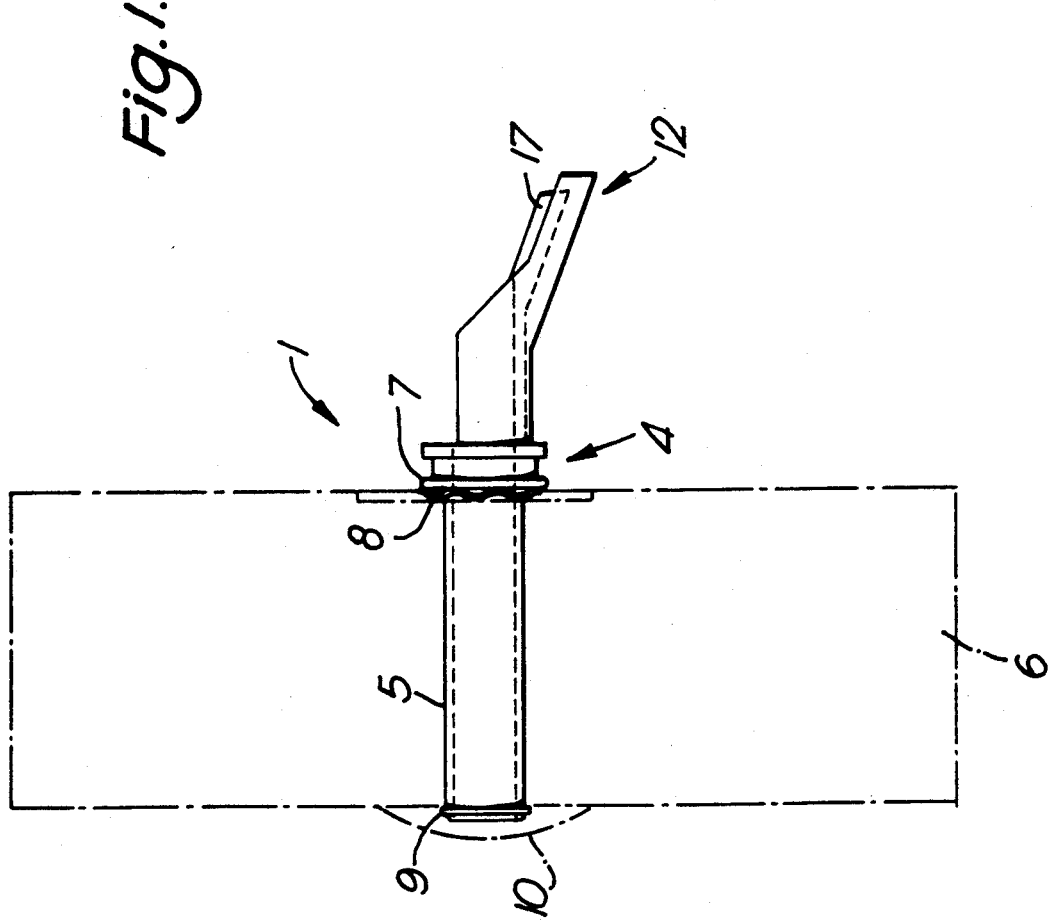
Figure 3:
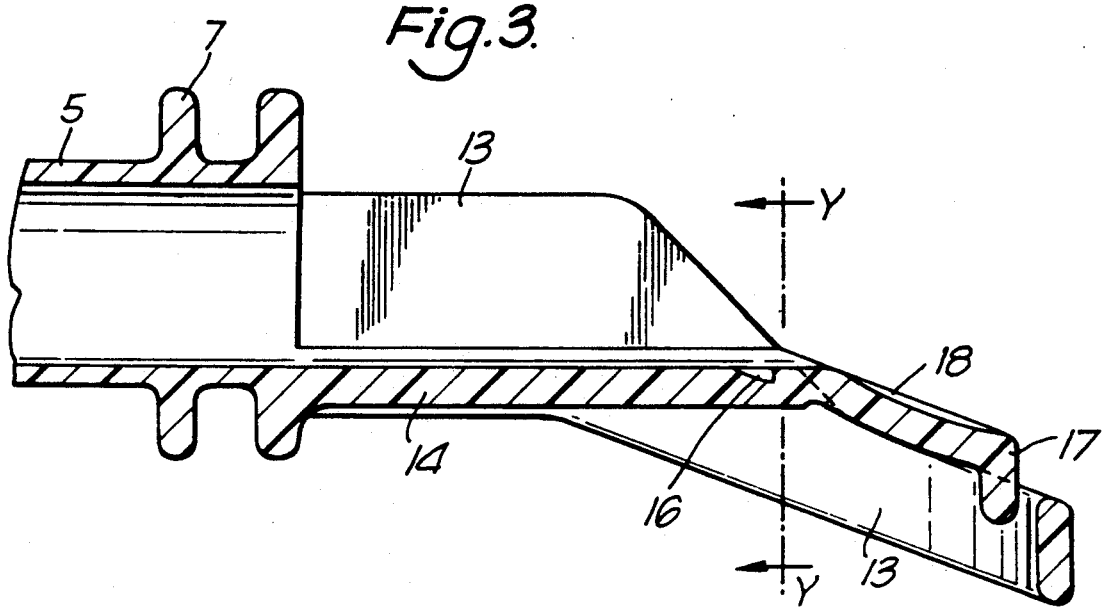
Figure 4:
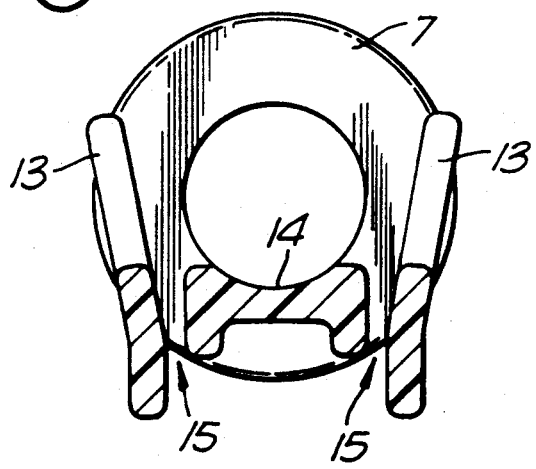

The invention is further described with reference to the accompanying drawings, in which:

FIG. 1 shows a wheel mounting assembly according to the invention in a position ready to be mounted on a stub axle of a golf trolley (not shown) or other similar wheeled vehicle;

FIGS. 2a-e are respectively plan side elevation, bottom and end views of the outer axle member;

FIG. 3 is an enlarged longitudinal section (scale 2:1) through outer axle member taken on X-X (FIG. 2b); and FIG. 4 is a transverse section taken on Y—Y (FIG. 3).

Referring to the drawings, the detachable wheel mounting assembly according to this invention, indicated generally at (1) (FIG. 1) is designed for rapid releaseable mounting on a stub axle (2) rigidly supported at one end by a frame member (3), e.g. a wheel strut forming part of the frame of the golf trolley or other vehicle (not shown).

As will be apparent, the wheel mounting assembly (1) is simply a sliding fit on the free end of the stub axle (2) and is retained thereon by a releaseable detent means, to be described.

Referring to FIG. 1, the wheel mounting assembly (1) comprises a molded plastics outer axle member (4), e.g. of elastomer loaded acetal, glass filled nylon or polypropylene or other, preferably low friction resin, and shown in more detail in FIGS. 2a-e, 3 and 4.

Over the major part of its length, the outer axle member (4) comprises a molded plastics sleeve (5) slidably receivable as a close sliding fit on the stub axle (2). Rotatably received and captive on the sleeve (5) is the wheel (6) shown in outline in FIG. 1, the wheel being of a quite conventional construction and comprising a central hub with a bearing aperture therein slidably and rotatably received on the outer surface of the sleeve (5). Conventional bearings may be provided, if desired, but conveniently the sleeve itself is a low friction, hard wearing material and acts as the wheel bearing.

At its proximal end, the sleeve (5) has an integral collar (7) which acts as an abutment shoulder or stop for the axial positioning of the wheel (6) on the sleeve and with a wave thruster (8) interposed therebetween.

At its distal end, protruding through the wheel hub, the sleeve (5) is provided with a captive washer, circlip, split ring, split pin or the like (9) holding the wheel captive on the sleeve, and covered, if desired, by a dust cap (10) shown in outline. Most conveniently the captive fixing means (9) is simply a split ring or circlip seating in a groove (11) in the distal end of the sleeve (5). As will be apparent, when fitted, the wheel (6) forms a unitary assembly with the outer axle member (4) for the purpose of attachment to the golf trolley via the sliding engagement on the stub axle (2) and its subsequent detachment.

As already mentioned the wheel assembly (1) is held in position on the stub axle (2) by a finger releasable detent. Referring more particularly to FIGS. 2a–e, 3 and 4, this detent comprises a rearward axial extension (12) to the sleeve (5) and integral therewith. This rearward extension (12) to the sleeve comprises an outer, downwardly inclined boundary wall or guard member (13) integral with the sleeve and enclosing an axially extending resilient lever member (14) integral with the sleeve but separated on either side from the boundary wall or guard member (13) by slots (15) (see FIG. 4). At its distal end, the lever member (14) is provided with a detent notch (16) and with a downwardly inclined thumb or finger tab (17) provided on its upper surface with a shallow depression (18). When engaged in the stub axle (2) the detent notch (16) resiliently engages a complementary detent ridge (19) on the distal end of the stub axle (2), and formed in this case by the head of a molded end plug (20) fitting into the distal end of the tubular stub axle, see FIG. 1.

In mounting the wheel on the golf trolley, or whatever, the whole assembly, wheel (6) and outer axle member (4), are presented as an integral unit to the stub axle (2) and slid axially thereonto until the detent notch (16) resiliently snaps over and engages the detent ridge (19). The wheel assembly is then firmly held in position. To release the wheel assembly, light finger pressure on the resilient detent lever (14) disengages the detent and permits disengagement of the wheel assembly from the stub axle.

The rearwardly extending boundary wall or guard member 13) surrounding the integral detent lever (14) and thumb tab (17) serves three important functions:

1. It serves as a guard member to protect the detent lever (14) and thumb tab (17) from accidental damage and perhaps, more significantly, accidental operation of the lever and accidental release of the detent causing the wheel to fall off;
2. it provides a reaction member, or fulcrum for engagement by the tip of the forefinger when operating the detent lever with the thumb (or vice versa);
3. it serves as a stop to limit the extend to which the detent lever can be depressed by finger or thumb pressure, the finger or thumb, as the case may be, as the thumb tab (17) is depressed, the finger or thumb comes to rest on the guard member (13) and preventing the application of further pressure and possible bending of the lever beyond its elastic limit.

In the preferred embodiment illustrated, the invention thus provides an extremely simply, inexpensive but effective means of detachably mounting the wheels on a golf trolley or other similar vehicle such as a perambulator, push chair or the like. Whilst the invention has been particularly described with reference to a preferred embodiment, it will be apparent that various modifications and/or improvements may be made therein without departing from the scope of the invention as herein described.

I claim:

1. A detachable wheel mounting assembly for detachably mounting a wheel on a stub axle or shaft fixedly supported by a frame assembly of a vehicle to be provided with detachable wheels, said wheel assembly comprising
   (1) an outer axle member of molded resilient plastics material having a sleeve member receivable as sliding fit axially on the stub axle or shaft;
   (2) a resilient detent integral with the sleeve and resiliently engageable with a cooperating detent on the stub axle or shaft to retain the sleeve in position thereon;
   (3) finger operable detent release means permitting the cooperating detents to be released and the outer axle member comprising said sleeve to be axially disengaged from the stub axle;
   (4) said resilient detent and finger operable detent release means comprising a resilient lever arm integral with and extending axially from the sleeve member, a detent formed on said lever and engageable with a cooperating detent on the stub axle by virtue of the resilience of the lever arm, said lever arm being movable by applied finger pressure against its resilience to disengage the cooperating detents and thereby to permit the disengagement of the wheel assembly as a whole from the stub axle; and
   (5) a wheel rotatably mounted on the sleeve, said wheel being captively held on the outer axle member and forming a unitary assembly therewith for the purpose attachment to or detchment from the said vehicle.

2. A wheel assembly according to claim 1, wherein the detent on the resilient lever arm comprises a detent notch therein resiliently engageable with a cooperating detent in the form of a ridge on the stub axle.

3. A wheel assembly according to claim 2, wherein the cooperating detent ridge on the stub axle is provided on a molded end plug fitting in the distal end of the stub axle.

4. A wheel assembly according to claim 1, wherein the resilient lever arm is surrounded by a molded guard member integral with the sleeve and extending axially therefrom on either side of the lever arm to prevent accidental operation of the lever arm and accidental release of the detent.

5. A wheel assembly according to claim 1, wherein the wheel is held captive on the outer axle between an integral collar on said sleeve at its proximal end and a captive fixing means at the proximal end of the sleeve.

6. A wheel assembly according to claim 5, wherein the captive fixing means is selected from the group consisting of a captive washer, circlip, split ring or split pin engaging the distal end of the sleeve protruding from the hub of the wheel mounted thereon.

7. A wheel assembly according to claim 1, wherein the outer axle member is selected from the group consisting of molded elastomer reinforced polyacetal or glass reinforced nylon or polypropylene.

8. A detachable wheel mounting assembly for detachably mounting a wheel on a stub axle or shaft fixedly supported by a frame assembly of a vehicle to be provided with detachable wheels, said wheel assembly comprising
   (1) an outer axle member of molded resilient plastics material having a sleeve member receivable as sliding fit axially on the stub axle or shaft;
   (2) a resilient detent integral with the sleeve and resiliently engageable with a cooperating detent on the stub axle or shaft to retain the sleeve in position thereon;
   (3) finger operable detent release means permitting the cooperating detents to be released and the outer axle member comprising said sleeve to be axially disengaged from the stub axle;
   (4) said resilient detent and finger operable detent release means comprising a resilient lever arm integral with and extending axially from the sleeve member, a detent formed on said lever and engageable with a cooperating detent on the stub axle by virtue of the resilience of the lever arm, said lever arm being movable by applied finger pressure against its resilience to disengage the cooperating detents and thereby to permit the disengagement of the wheel assembly as a whole from the stub axle; and
   (5) a wheel rotatably mounted on the sleeve, said wheel being captively held on the outer axle member between an integral collar on said sleeve at its proximal end and a captive fixing means at the proximal end of the sleeve wherein said fixing means is selected from the group consisting of a captive washer, circlip, split ring and split pin engaging the distal end of the sleeve protruding from the hub of the wheel mounted thereon and said wheel and said outer axle member forming a unitary assembly for the purpose of attachment to or detachment from the said vehicle.

9. A detachable wheel mounting assembly for detachably mounting a wheel on a stub axle or shaft fixedly supported by a frame assembly of a vehicle to be provided with detachable wheels, said wheel assembly comprising
   (1) an outer axle member of molded resilient plastics material having a sleeve member receivable as sliding fit axially on the stub axle or shaft;
   (2) a resilient detent integral with the sleeve and resiliently engageable with a cooperating detent on the stub axle or shaft to retain the sleeve in position thereon;
   (3) finger operable detent release means permitting the cooperating detents to be released and the outer axle member comprising said sleeve to be axially disengaged from the stub axle;
   (4) said resilient detent and finger operable detent release means comprising a resilient lever arm integral with and extending axially from the sleeve member, a detent formed on said lever and engageable with a cooperating detent on the stub axle by virtue of the resilience of the lever arm, said lever arm being movable by applied finger pressure against its resilience to disengage the cooperating detents and thereby to permit the disengagement of the wheel assembly as a whole from the stub axle; and
   (5) a wheel rotatably mounted on the sleeve, said wheel being captively held on the outer axle member which member is selected from the group consisting of molded elastomer reinforced polyacetal or glass reinforced nylon and polypropylene and said wheel and said outer axle member forming a unitary assembly for the purpose of attachment to or detachment from the said vehicle.

* * * * *